United States Patent [19]

Papastavros

[11] Patent Number: 4,928,490

[45] Date of Patent: May 29, 1990

[54] TURBINE HOUSING POWER SYSTEM WITH GEAR HOUSING

[76] Inventor: Demos Papastavros, 2429 NE. 184th Ter., N. Miami Beach, Fla. 33160

[21] Appl. No.: 384,408

[22] Filed: Jul. 24, 1989

[51] Int. Cl.$^5$ ............................................. F01K 19/04
[52] U.S. Cl. ........................................ 60/670; 60/685
[58] Field of Search .................. 60/643, 645, 670, 685

[56] References Cited

U.S. PATENT DOCUMENTS 4,240,260 12/1980 Gustafson ............................. 60/670
4,479,354 10/1984 Cosby ................................... 60/670

Primary Examiner—Allen M. Ostrager

[57] ABSTRACT

This invention relates to a power turbine system which consists of a first power turbine and a second compressor turbine. Both turbines are contained in the same housing and each turbine is connected to an individual shaft. The shafts of each turbine are interconnected by the individual gears of the gear housing system. An external energy source provides heat energy to the working fluid which enters and drives the first power turbine. The second compressor turbine receives the hot exhaust fluid of the first power turbine and compresses and circulates the gaseous fluid as it leaves the outlet of the second compressor turbine and the outlet of the turbine housing. The working fluid then flows to the inlet of the condenser. This invention is designed to allow the second compressor turbine to rotate more often than the first power turbine as a result of the gears and shafts located in the gear housing system. The rotor of the second compressor turbine has more rotor blades than the rotor of the first power turbine.

11 Claims, 2 Drawing Sheets

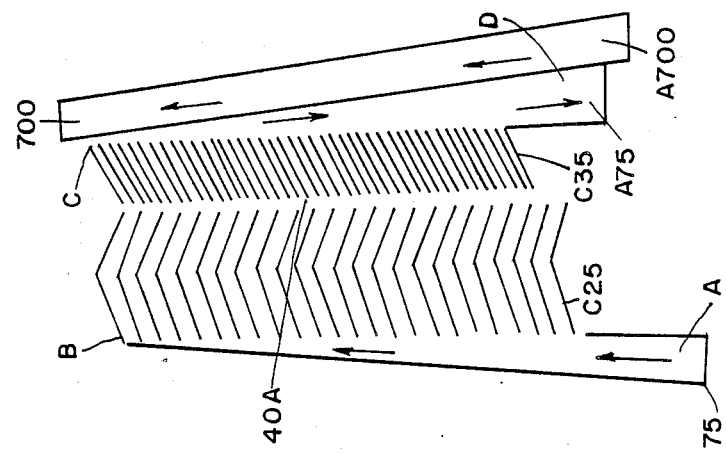
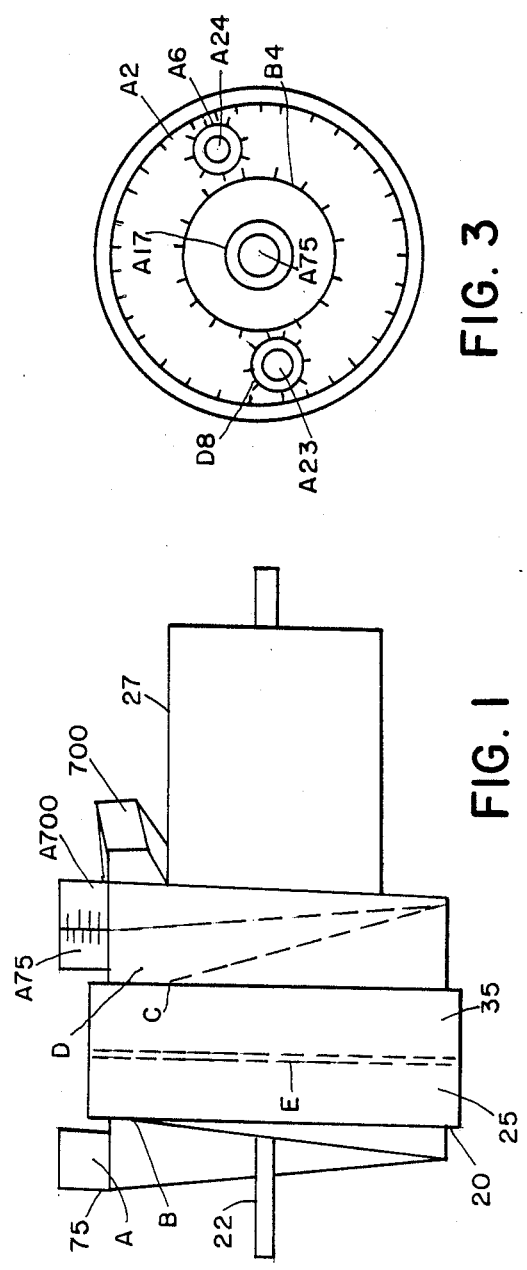
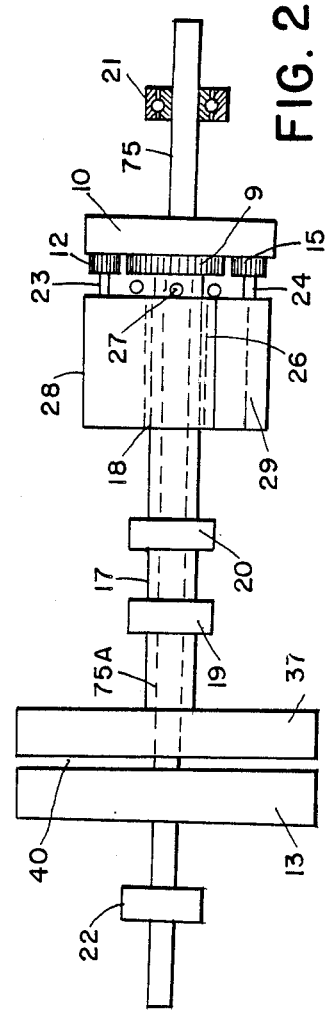

TURBINE HOUSING POWER SYSTEM WITH GEAR HOUSING

SUMMARY OF THE INVENTION

This invention uses less fuel to operate and pollutes less than conventional power plant systems. The power turbine system of this invention operates with two turbines that are in the same housing. The first power turbine produces the power and the second compressor turbine operates as a compressor system which absorbs the exhaust fluid from the first power turbine outlet and circulates and compresses the gaseous working fluid as it leaves the second compressor turbine outlet and flows to the condenser inlet. Both turbines are connected to each individual shaft and each of the individual gears in the gear housing system. The gear housing system is designed to allow the second compressor turbine to rotate faster than the first power turbine. The rotor of the second compressor turbine has more rotor blades than the rotor of the first power turbine.

If desired, the turbines in this invention, a first power turbine and a second compressor turbine that are in the same turbine housing, may be used in the turbine systems described in the Pat. Nos. 4,378,678 (Turbine System), 4,502,277 (Turbine Power Plant System), 4,420,941 (Cooling System), 4,733,537 (Turbine Power Plant with Exhaust Turbine Systems and patent application Ser. No. 07/150,636. The use of the second compressor turbine of this invention in conjunction with the turbines in the above mentioned patents may be of value in saving energy and producing less pollution than conventional power plant systems.

DESCRIPTION OF THE DRAWINGS

FIG. 1 is a schematic diagram showing the turbine housing which consists of two turbines located inside the same housing and connected to a gear housing.

FIG. 2 is a schematic diagram showing the interior of the turbine housing, the first power turbine, the second compressor turbine and the interior of the gear housing with a number of gears.

FIG. 3 is a schematic diagram showing the various gears and shafts in the gear housing.

FIG. 4 is a schematic diagram representing the turbine blades of the power turbine and the turbine blades of the compressor turbine.

Figure 5:
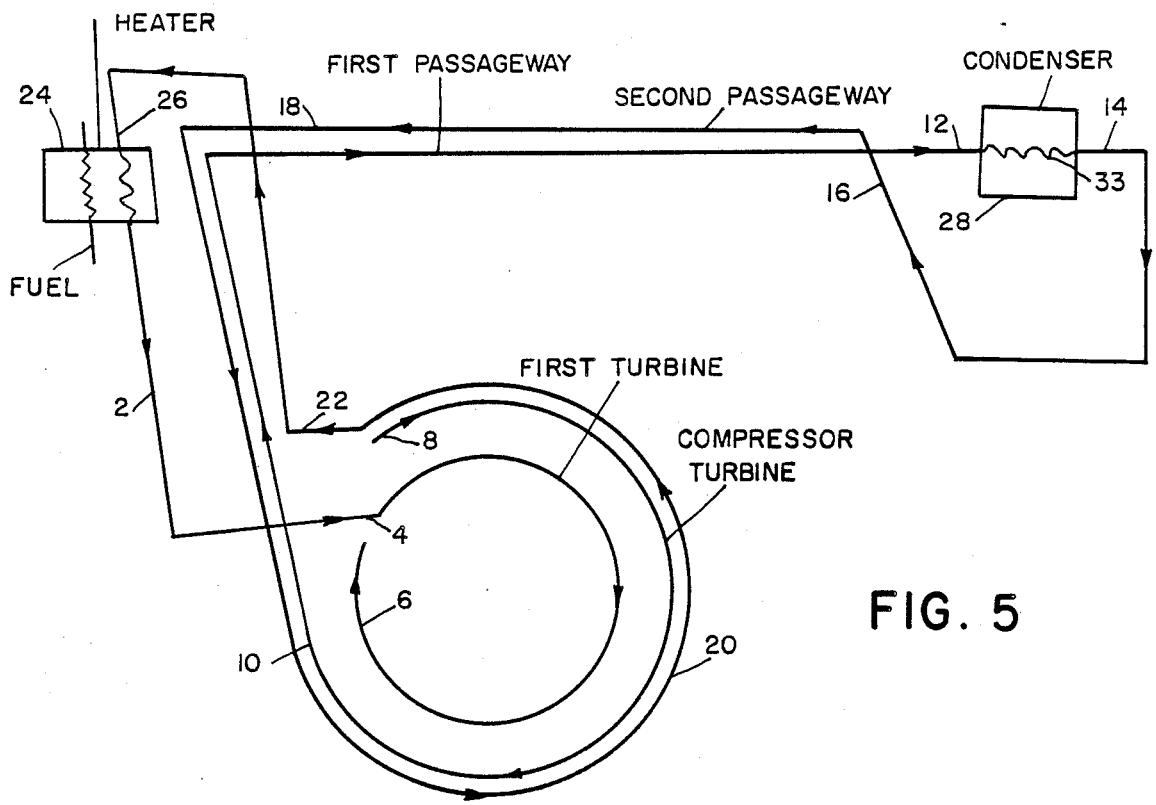
FIG. 5 is a schematic diagram representing a closed loop turbine power system using the turbine housing in FIG. 1.

Before explaining the enclosed embodiment of the present invention in detail it is to be understood that the invention is not limited in its application to the detals of the particular arrangement shown since the invention is capable of other embodiments. Also, the terminology used herein is for the purpose of description and not limitation.

DETAILED DESCRIPTION

FIG. 1 represents the first power turbine 25 and the second compressor turbine 35 which are enclosed in the same turbine housing 20. The first power turbine 25 is connected to shaft 22.

Referring to FIG. 1, the first power turbine 25 receives the working fluid at point A and the exhaust fluid leaves the first power turbine 25 at point E. The second compressor turbine 35 receives the exhaust fluid of the first power turbine 25 at point E and the exahsut fluid of the second compressor turbine 35 is pressurized and leaves at point A75. Gear housing 27 contains different sized gears which allow the second compressor turbine 35 to rotate faster than the first power turbine 25. The rotor of the second compressor turbine 35 has more rotor blades than the rotor of the first power turbine 25.

The first power turbine 25 has a fluid conduit 75 which "tapers in" decreasing in size, from point A to point B at the inlet of turbine housing 20. The second compressor turbine 35 has a fluid conduit A75 which "tapers out" increasing in size from point C to point D at the outlet of turbine housing 20. The hot exhaust fluid leaves the first power turbine 25 at point E and enters the second compressor turbine 35 at point E at which time the working fluid is pressurized as it flows from point C to the outlet of fluid conduit A75 at point D. The cool condensed fluid from the condenser (not shown) enters fluid consuit A700 and absorbs heat energy from the hot exhaust fluid flowing from point D to point C, therefore preheating the working fluid coming from the condenser as it flows from the inlet of fluid conduit A700 to the outlet of fluid conduit 700 which then enters the heater (not shown).

FIG. 2 represents the interior operation of the first power turbine 13, the second compressor turbine 37 and their associated shafts and gears in the gear housing. The first power turbine 13 is operatively connected to gear 10 and shaft 75. The second compressor turbine 37 is operatively connected to gear 9 and shaft 17. Gears 15 and 12 are operatively connected to shafts 24 and 23, respectively. The bearing rings 21 and 22 support the main shaft 75, while bearing rings 19 and 20 support the second shaft 17 (shaft 18). Shaft 17 rotates outside the main shaft 75A (shaft 75). Shat 23 and shaft 24 are supported by support housing 28. Shaft 18 (shaft 17) rotates freely inside support housing 28 at point 6. Support housing 28 is split in half at point 29 for maintenance purposes, if needed.

Gear housing 28 contains a ring of bolts 27 which support gear 9 and the second compressor turbine 37, therefore not allowing movement between the two turbines, the first power turbine 13 and the second compressor turbine 37, at point 40.

FIG. 3 shows a crossection of the gear housing system, the first larger gear A2 is operatively connected to shaft A75 which in FIG. 2 represents gear 10 and shaft 75, respectively. The second gear in size is B4 which is operatively connected to shaft A17, which in FIG. 2 represents gear 9 and shaft 17, respectively. The two smallest gears D8 and A6 are operatively connected to shafts A23 and A24 which in FIG. 2 represent gears 12 and 15 and shafts 23 and 24, respectively.

FIG. 4 reprsents a schematic drawing of the rotor blades of the first power turbine and the second compressor turbine. Rotor blades C25 represent the blades of the first power turbine 25 in FIG. 1. Rotor blades C35 represent the rotor blades of the second compressor turbine 35 in FIG. 1. Conduit 75 in FIG. 4 shows the working field conduit which passes outside the rotor blades C25 "tapering in" (decreasing in size) from point A to point B at the inlet of the turbine housing. As the working fluid enters conduit 75, it hits all the rotor blades of the first power turbine continuously and equally. Fluid conduit 75 in FIG. 4 refers to fluid conduit 75 in FIG. 1. Fluid conduit A75 in FIG. 4 shows the fluid conduit which passes outside the rotor blades C35 "tapering out" (increasing in size) from point C to point D at the outlet of the turbine housing. The hot exhaust fluid of the first power turbine enters the second compressor turbine and is pressurized as it flows from point C to point D in fluid conduit A75 (which refers to conduit A75 in FIG. 1)

A low pressure area is created between the rotor blades C25 at the first power turbine outlet and the rotor blades C35 at the second compressor turbine inlet. This low pressure area is at point 40A in FIG. 4 and refers to point E in FIG. 1 and point 40 in FIG. 2. This low pressure area makes the sysem operate. The second compressor turbine has more rotor blades and rotates faster than the first power turbine therefore pressurizing the hot exhaust fluid coming from the outlet of the first power turbine rotor blades C25.

Cool condensed fluid enters conduit A700 and absorbs heat energy from the hot exhaust fluid coming from the outlet of the second compressor turbine. A heat exchange process occurs as the hot exhaust fluidf rom the second compressor turbine outlet flows from point C to point D at the outlet of the turbine housing giving its heat energy to the cool condensed fluid flowing in the opposite direction as it flows from fluid conduit A700 to fluid conduit 700.

FIG. 5 represents a schematic drawing of the flow of working fluid in the closed loop cycle of the power turbine system. The working fluid receives heat energy from an external source in heater 24. The working fluid flows from the outlet of heater 24 through point 2 to the inlet of the first power turgine at point 4. The working fluid enters and hits all the rotor blades of the first power turbine equally and continuously as it flows from point 4 to point 6. The hot exhaust fluid of the first power turbine enters the second compressor turbine at point 8 and is pressured out by the time it reaches point 10. The working fluid flows through the first passageway arrangements of fluid conduit 12 to the inlet of condenser 28 and then through the passageway of fluid conduit 33 to the second passageway arrangement of fluid conduit 14 at the outlet of condenser 28. The working fluid then flows through the second passageway arrangement of fluid conduits 16, 18, 20 and 22. A heat exchange process occurs in which the passageway arrangements of fluid conduit 16 through to fluid conduit 22 receives heat energy from the fluid flowing in the opposite direction in the first passageway arrangements of fluid conduit 12 through to fluid conduits 10 and 8, respectively, therefore preheating the fluid in fluid conduit 22. The working fluid then flows to the inlet of heater 24 at point 26 where it receives additional heat energy.

Figure 6:
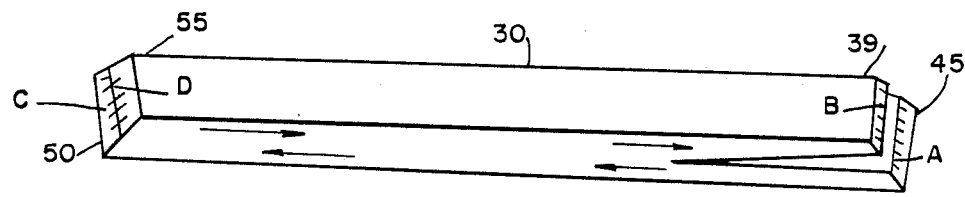
FIG. 6 is a schematic diagram showing a first passageway arrangement and a second passageway arrangement in a heat exchange relationship.

FIG. 6 represents two fluid conduits. The two fluid conduits are joined together to allow a heat exchange relationship between them. The passageway arrangements of the fluid conduits are separated and do not allow the fluid to mix together as shown by 30. The hot exhaust fluid flows through the first passageway arrangement entering at point 50 and leaving at pont 45. The first passageway arrangement is also referred to as the second fluid conduit means in the claims. The condensed fluid flows through the second passageway arrangement flowing in an opposite direction entering at point 39 and leaving at point 55. The second passageway arrangement is also referred to as the third fluid conduit means in the claims. In both first and second passageway arrangements a heat exchange relationship occurs between the two fluids. In FIG. 5, this heat exchange relationship starts at point 8 where the hot exhaust fluid from the compressor turbine flows through conduit 12 to the inlet of condenser 28. In FIG. 6 this refers to the fluid entering at point C and flowing through the conduit to point A. In FIG. 5, the cool condensed fluid begins its heat exchange relationship at point 16 and continues through conduit 22. In FIG. 6, this refers to the fluid entering at point B and flowing to point D. The condensed fluid from the outlet of condenser 28 absorbs the hot exhaust energy as it flows in an opposite direction, from fluid conduit 12 through to conduit 8 as shown in FIG. 5. A starter (not shown in the figures) is used to begin operation of the turbine housing power system.

I claim:

1. A turbine housing power system contining a turbine housing which has a fluid inlet and a fluid outlet and further comprising:

a power tubine located inside said turbine housing having a fluid inlet and fluid outlet, said power turbine being operatively connected to a first shaft, a compressor turbine located inside said turbine housing having a fluid inlet and fluid outlet, said compressor turbine being operatively connected to a second shaft, said second shaft having a hollow core inside which said first shaft is located therefore allowing said second shaft to rotate independently around said first shaft, a first fluid conduit means operatively connecting said inlet of said turbine housing to said inlet of said power turbine, said first fluid conduit is designed to pass outside the rotor blades of said power turbine, "tapering in", decreasing in size from said inlet of said turbine housing to said inlet of said power turbine, a means for allowing working fluid to flow from said outlet of said power turbine to the inlet of said compressor turbine, a second fluid conduit means operatively connecting said outlet of said compressor turbine to said outlet of said turbine housing, said second fluid conduit is designed to pass outside the rotor blades of said compressor turbine, "tapering out", increasing in size, from said outlet of said compressor turbine to said outlet of said turbine housing, a third fluid conduit means having a heat exchange relationship with said second fluid conduit means, said third fluid conduit containing condensed working fluid from an outside condensing source, the working fluid in said third fluid conduit absorbs the heat energy from the hot exhaust fluid flowing in said second fluid conduit through a heat exchange relationship, preheating the working fluid in said third fluid conduit before it reaches an outside heating source which adds addtional heat energy to the system.

2. A turbine housing system according to claim 1 and further comprising a gear housing operatively connected to said turbine housing power system, said gear housing consisting of:

a first large sized gear locarted inside said gear housing and attached to said first shaft, a second medium sized gear located inside said gear housing and attached to said second shaft, opposite the end of said second shaft that said compressor turbine is attached to said second shaft, said second shaft having a hollow core in which said first shaft is located therefore allowing said second shaft to rotate inependently of said first shaft, a number N, where N is a whole number greater than one, small sized gears located inside said gear housing and attached to each end of N shafts, said N small sized gears are identical in size and are located inbetween said large sized gear and said medium sized gear, said N small sized gears and said large sized gear rotate in the same direction but in an opposite direction from the medium sized gears, each of said N shafts having basic supports in said gear housing, said gear housing in turbine housing power system is designed to allow said compressor turbine to rotate faster than said power turbine and in opposite directions eventhough both turbines operate in the same turbine housing.

3. A turbine housing system according to claim 2 and further comprising a means for said first fluid conduit which passes outside the rotor blades of said power turbines to allow the working fluid to enter said inlet of said turbine housing and hit all the rotor blades of said power turbine, equally, continuously and with the same pressure.

4. A turbine housing system according to claim 3 and further comprising a means for allowing the gaseous working fluid to have a greater pressure at said inlet of said power turbine than said inlet of said compressor turbine with both turbines operating in the same turbine housing.

5. A turbine housing system according to claim 4 in which the rotor of said compressor turbine has more rotor blades than the rotor of said power turbine.

6. A turbine housing power system according to claim 5 and further comprising the following in a closed loop cycle:

a heater having a fluid inlet and a fluid outlet and a heating means between said fluid inlet and said fluid outlet, a fluid conduit means operatively connecting said fluid outlet of said heater to said inlet of said turbine housing, said turbine housing having said fluid inlet and saif fluid outlet, said power turbine located inside said turbine housing having said fluid inlet and said fluid outlet, said power turbine being operatively connected to said first shaft, said compressor turbine located inside said turbine housing having said fluid inlet and said fluid outlet, said compressor turbine being operatively connected to said second shaft, said second shaft having a hollow core inside which said first shaft is located therefore allowing said second shaft to rotate independently around said first shaft, said first fluid conduit means operatively connecting said inlet of said turbine housing to said inlet of said power turbine, said first fluid conduit is designed to pass outside the rotor blades of said power turbine, "tapering in", decreasing in size from said inlet of said turbine housing to said inlet of said power turbine, said means for allowing working fluid to flow from said outlet of said power turbine to the inlet of said compressor turbine, a condenser having a fluid inlet and a fluid outlet and a condensing means between its inlet and outlet, a second fluid conduit means operatively connecting said outlet of said compressor turbine to said inlet of said condenser, said second fluid conduit is designed to pass outside the rotor blades of said compressor turbine, "tapering out", increasing in size, from said outlet of said compressor turbine to said outlet of said turbine housing, a third fluid conduit means having a heat exchange relationship with said second fluid conduit, said third fluid conduit operatively connecting said outlet of said condenser to said inlet of said heater, said third fluid conduit means containing condensed working fluid from said condenser, the working fluid in said third fluid conduit absorbes the heat energy from the hot exhaust fluid flowing in said second fluid conduit through a heat exchange relationship, preheating the working fluid in said third fluid conduit before it reaches said heater where additional heat energy is added to the system, said gear housing comprising of said large sized gear attached to said first shaft, medium sized gear attached to said second shaft opposite the end of second shaft that said compressor turbine is attached, said number N small sized gears attached to each end of said N shafts.

7. A turbine housing system according to claim 6 in which the function of said compressor turbine is to compress and circulate the gaseous working fluid and force it to said inlet of condenser and said heater and the function of said power turbine produces mechanical energy, both turbines operating in the same turbine housing.

8. A turbine housing system according to claim 7 and further comprising a means for said first fluid conduit which passes outside the rotor blades of said power turbines to allow the working fluid to enter said inlet of said turbine housing and hit al the rotor blades of said power turbine, equally, continuously and with the same pressure.

9. A turbine housing sysem according to claim 8 and further comprising a means for allowing the gaseous working fluid to have a greater pressure at said inlet of said power turbine than said inlet of said compressor turbine, with both turbines operating in the same turbine housing.

10. A turbine housing system according to claim 9 in which the rotor of said compressor turbine has more rotor blades than the rotor of said power turbine.

11. A turbine housing system according to vclaim 10 and further comprising a means for said second fluid conduit means and said third fluid conduit means to be in a heat exchange relationship, said second and said third fluid conduits are joined together but divided in two separate halves with a common wall separating the two fluid conduits, the hot exhaust fluid of said compressor turbine flows in one direction in the second fluid conduit, and the cool condensed fluid flows in an opposite direction in the third fluid conduit, said heat exchange relationship takes place between said outlet of said compressor turbine to said inlet of said condenser.

* * * * *